United States Patent
Meyers et al.

(10) Patent No.: US 10,992,391 B1
(45) Date of Patent: Apr. 27, 2021

(54) SYSTEM AND METHOD FOR COMMUNICATION OF INFORMATION USING ENTANGLED PHOTONS

(71) Applicant: U.S. Army Combat Capabilities Development Command, Army Research Labortary, Adelphi, MD (US)

(72) Inventors: Ronald E. Meyers, Columbia, MD (US); Keith S. Deacon, Columbia, MD (US)

(73) Assignee: The United States of Americas as represented by the Secretary of the Army, Washington, DC (US)

(*) Notice: Subject to any disclaimer, the term of this patent is extended or adjusted under 35 U.S.C. 154(b) by 0 days.

(21) Appl. No.: 16/829,272

(22) Filed: Mar. 25, 2020

Related U.S. Application Data (60) Provisional application No. 62/941,233, filed on Nov. 27, 2019.

(51) Int. Cl.
*H04B 10/70* (2013.01)
*H04B 10/67* (2013.01)
(Continued)

(52) U.S. Cl.
CPC ......... *H04B 10/70* (2013.01); *H04B 10/0799* (2013.01); *H04B 10/2507* (2013.01); *H04B 10/676* (2013.01)

(58) Field of Classification Search
CPC ........ H04B 10/70; H04B 10/66; H04B 10/25; H04B 10/50; H04B 10/503; H04B 10/516;
(Continued)

(56) References Cited

U.S. PATENT DOCUMENTS

| 8,503,885 B2 * | 8/2013 | Meyers | B82Y 10/00 398/140 |
| 9,123,114 B2 | 9/2015 | Meyers et al. | |

(Continued)

OTHER PUBLICATIONS

Almeida et al; Quantum Communications using polarization Encoded photons in Optical fiber; pp. 205-208; 2013. (Year: 2013).*

(Continued)

*Primary Examiner* — Amritbir K Sandhu
(74) *Attorney, Agent, or Firm* — Emily C. Moscati (57) ABSTRACT

Modulated entangled photon pairs are used to transmit data between a sender and receiver subsystem. The sender subsystem comprises at least one data input, a modulator to modulate the photons, a photon combiner and a transmitter coupler to direct the modulated entangled photon pairs towards a receiver. The receiver subsystem comprises a receiver coupler, a photon de-combiner to direct the photons to polarization analyzers to transmit photons of a specified polarization to detectors, and a processor to record the information transmitted by the detectors. The sender subsystem transmits information to the receiver subsystem through the modulation of the entangled photon state. The present system and method is quantum which provides advantages over classical and optical communications. These advantages include using less power to transmit information, and allowing transmission through and around obstructions and adverse environments.

19 Claims, 5 Drawing Sheets

(51) Int. Cl.
*H04B 10/2507* (2013.01)
*H04B 10/079* (2013.01)

(58) Field of Classification Search
CPC .... H04B 10/2569; H04B 10/60; H04B 10/85; H04B 10/6151; H04B 10/0799; H04B 10/2507; H04B 10/676; H04L 7/0075; H04L 9/0852; H04L 5/04; H04L 9/0618; H04L 9/0855; H04L 9/0858; H04L 27/00; H04L 9/0662; H04L 9/12; H04L 9/3297; H01S 3/005
USPC ..... 398/28, 140–172; 380/44, 187, 256, 279
See application file for complete search history.

(56) References Cited

U.S. PATENT DOCUMENTS

| | | | |
|---|---|---|---|
| 9,131,128 B2 | 9/2015 | Meyers et al. | |
| 9,287,994 B2* | 3/2016 | Nordholt | H04K 1/08 |
| 10,193,637 B2* | 1/2019 | Drost | H04B 10/70 |
| 10,341,096 B1* | 7/2019 | Lentine | H04L 9/0858 |
| 2003/0133714 A1* | 7/2003 | Gat | H04L 9/0852 |
| | | | 398/140 |
| 2007/0065155 A1* | 3/2007 | Luo | H04B 10/70 |
| | | | 398/141 |
| 2009/0268276 A1* | 10/2009 | Lee | H04B 10/70 |
| | | | 359/330 |
| 2010/0046754 A1* | 2/2010 | Gilfedder | B82Y 10/00 |
| | | | 380/255 |
| 2010/0079833 A1* | 4/2010 | Langford | B82Y 10/00 |
| | | | 359/107 |
| 2010/0094842 A1* | 4/2010 | Fattal | H04L 9/0852 |
| | | | 707/705 |
| 2010/0111541 A1* | 5/2010 | Trojek | H04L 9/0852 |
| | | | 398/152 |
| 2010/0195831 A1* | 8/2010 | Tanaka | H04L 9/0858 |
| | | | 380/256 |
| 2011/0075839 A1* | 3/2011 | Noh | H04L 9/0858 |
| | | | 380/44 |
| 2015/0055961 A1* | 2/2015 | Meyers | H04B 10/70 |
| | | | 398/140 |
| 2015/0372768 A1* | 12/2015 | Dynes | H04B 10/70 |
| | | | 398/188 |
| 2016/0047643 A1* | 2/2016 | Yuan | H01S 5/4006 |
| | | | 398/25 |
| 2016/0164615 A1* | 6/2016 | Dailey | H04B 10/70 |
| | | | 398/149 |
| 2017/0155499 A1* | 6/2017 | Han | H04L 9/0852 |
| 2018/0241480 A1* | 8/2018 | Hughes | G06N 10/00 |
| 2018/0253599 A1* | 9/2018 | Shepard | G06K 9/00469 |
| 2020/0145115 A1* | 5/2020 | Kirby | G06N 10/00 |
| 2020/0150240 A1* | 5/2020 | Huwer | G01S 7/4865 |

OTHER PUBLICATIONS

Meyers et al. "A Quantum Network with Atoms and Photons", Sep. 2016, United States.
P. Lodahl, A. Lagendijk "Transport of Quantum Noise through Random Media," Physical Review Letters 94 2005 (153905), Apr. 22, 2005.
Lodahl et al. (2009)"Observation of Spatial Quantum Correlations Induced by Multiple Scattering of Nonclassical Light". Physical Review Letters, 102(19), 193901.

* cited by examiner

SYSTEM AND METHOD FOR COMMUNICATION OF INFORMATION USING ENTANGLED PHOTONS

CROSS-REFERENCE TO RELATED APPLICATIONS

This application claims priority benefit to U.S. Provisional Patent Application No. 62/941,233, filed on Nov. 27, 2019, which is incorporated herein by reference in its entirety.

GOVERNMENT INTEREST

The embodiments described herein may be manufactured, used, and/or licensed by or for the United States Government without the payment of royalties thereon.

BACKGROUND

Technical Field

The embodiments herein generally relate to the processing and/or transmission of data based upon quantum properties, more specifically quantum entanglement.

Description of the Related Art

Quantum properties include quantum entanglement and quantum teleportation of information, which is linked to the property of quantum entanglement. Quantum entanglement can exist between any two quantum systems such as between two photons, two atomic/ionic systems, or between a photon and an atom/ion based quantum system.

Quantum communications may sometimes be used in conjunction with compression techniques involving the usage of qubits. Qubits are units of quantum information that may be visualized by a state vector in a two-level quantum-mechanical system. Unlike a binary classical bit, a qubit can have the values of zero or one, or a superposition of both. A qubit may be measured in basis states (or vectors) and a conventional Dirac symbol is used to represent the quantum state values of zero and one herein, as for example, $|0\rangle$ and $|1\rangle$). For example, on a physical qubit this may be implemented by assigning the value "0" to a horizontal photon polarization and the value "1" to the vertical photon polarization. The "pure" qubit state is a linear superposition of those two states which can be represented as a combination of $|0\rangle$ and $|1\rangle$ or $q_k = A_k|0\rangle + B_k|1\rangle$ or in generalized form $A_n|0\rangle$ and $B_n|1\rangle$ where $A_n|0\rangle$ and $B_n|1\rangle$ represent the corresponding probability amplitudes and $A^2_n + B^2_n = 1$. Unlike classical bits, a qubit can exhibit quantum properties such as quantum entanglement, which allows for higher correlation than that possible in classical systems.

A pair of photons which are entangled can be referred to as an entangled photon pair. When one photon of an entangled photon pair is measured, the determination of the state of that photon (such as polarization or angular momentum) in effect determines the state of the other photon of the entangled photon pair, since entangled photon pairs are the conjugates of one another. In this example, each photon of the entangled pair may be considered a half of the entangled photon pair.

Prior art optical communications systems generally use watts of optical power in fiber systems to hundreds of milliwatts in free-space systems to communicate information. Entanglement optical communications requires significantly fewer photons than conventional optical communications by approximately 12 orders of magnitude, e.g. picowatts of optical power to transmit information.

Prior art optical quantum communications systems generally require the use of ancillary classical communications channel between a sender and receiver to transmit information. These classical communications systems are generally disrupted by scattering in the transmission path or atmospheric caused phase aberrations over free-space paths. Entangled photons are reasonably insensitive to atmospheric phase aberrations and scattering since photons do not exhibit polarization until after measurement.

Prior art systems generally work over either free-channels or fiber optic channels. One advantage of the present invention is that the system and method can communicate over fiber optic channels, free-space channels or a mixture of free-space and fiber optic channels.

Prior art optical communications systems typically rely on external clocks or very bright optical pulses at ancillary wavelengths to provide timing information on when information is being communicated. In the present system and method, the entanglement of the photon pairs can be used to adjust or correct timing after or during information communication to optimize the information transfer.

Prior art optical communications generally rely on information being transmitted on specific wavelengths or wavelength bands such as the International Telecommunications Union (ITU) grid specifications for coarse wavelength division multiplexing (CWDM) and dense wavelength division multiplexing (DWDM). In these prior art optical communications transmission of information occurs on each channel individually. The present system and method can operate using a wide range of photon wavelengths allowing the invention to be optimized for operational transmission conditions and further allowing encoding of information between multiple wavelength pairs to increase the information transmission rate.

SUMMARY

The present invention is directed to a system and method for the communication of data using entangled photons. A preferred embodiment of the present invention includes a communication system comprising sender and receiver subsystems, and at least one pulsed entangled photon source configured to output a sequence of first and second entangled photons to the sender and receiver subsystems. The sender subsystem comprises at least one data input configured to receive inputted data, and a clock and a phase modulator to encode the inputted data onto the entangled photon state. The receiver subsystem comprises a clock, polarization analyzers, and optionally gated detectors to measure the encoded state transmitted by the sender.

The photons produced by an entangled photon system are in a known state of entanglement, for example, a $\phi^+$ Bell State=$|HH\rangle+|VV\rangle$ polarization entangled state. Each photon of a polarization entangled photon pair are un-polarized but the relationship between the entangled photons is such that, in the case of a $\phi^+$ Bell State, were one of the photons to be measured as $|H\rangle$ the other photon of the pair must also be measured as $|H\rangle$ to produce a coincident detection. It must be noted that to measure a coincidence maxima from a $\phi$ state polarizers before each detector must be in a parallel orientation to each other whereas to measure a coincidence maxima from a state, orientations of the polarizers must be orthogonal to each other.

In a preferred embodiment, the sender of a message modulates the state of one or both of the photons of the polarization entangled photon state to transform the entangled photon state to for example, $\psi^+$ Bell state=|HV>+ |VH>. The receiver makes coincident photon detection of the polarization entangled photon pairs after the photons have passed through polarization analyzers set to, for example, parallel polarizations, i.e. both polarizers oriented to transmit H polarized photons or both polarizers oriented to transmit V polarized photons. When the receiver measures a change in the number of coincident photons measured over some time interval dT then the receiver would know that the sender had changed the Bell state from a $\phi^+$ to a $\psi^+$.

Generally, when the polarizers prior to detection transmit photons that are parallel to each other a maxima of coincidence events occurs when the entangled photons are in $\phi^{+/-}$ state and a minima of coincident events or corresponding Glauber second order correlation ($G^{(2)}$) values are registered when the entangled photons are in a $\psi^{+/-}$ state. Due to this relationship between the Bell state being transmitted by the sender and the number of coincident events or corresponding $G^{(2)}$ values registered by the receiver over some dT a message can be encoded by the sender into the transmitted Bell state and decoded by the receiver in terms of relative coincidence counts. Such encoding may take the form of a binary decomposition of the information, Morse code or the like which may include transmission of encrypted messages. However, due to non-deterministic entangled photon generation, losses along the propagation path and imperfect detectors and an at least three stage encoding of a so called "1" or "0" value can improve robustness. This alternative means to distinguish the measurement of a transmitted bit value of "1" from "0" can be based on examining the $G^{(2)}$ or coincidence measurements at one sender modulator setting and the neighboring, i.e. in these measurements at different modulator settings bother earlier and later. In this protocol the function BitVal=sign(F(t−1)+F(t+1)−2F(t)] where sign is a function that returns a 1 or −1 if the argument is greater than or equal to 0 and −1 if the argument is less than 0, F is the number of coincidence counts or the $G^{(2)}$ value at time t measured over an interval dT. Each "1" or "0" being transmitted can be represented in this manner by a High-Low-High triplet for "1" and a Low-High-Low triplet for "0".

Other benefits of encoding information on entangled photon pairs include the ability of the receiver to authenticate the source encoded information and that the entanglement of entangled photon is largely insensitive to scattering and phase aberrations (Meyers et al. ARL TR-7786 "*A Quantum Network with Atoms and Photons*" September 2016; P. Lodahl, A. Lagendijk "*Transport of Quantum Noise through Random Media,*" Physical Review Letters 94 2005 (153905), 22 Apr. 2005; Lodahl et al. (2009) "*Observation of Spatial Quantum Correlations Induced by Multiple Scattering of Nonclassical Light*" Physical Review Letters 102 (19), 193901) since the photons do not exhibit polarization until after measurement. The Glauber second order correlation $G^{(2)}$ can be determined by taking the ratio of the probability to measure a coincidence between detector a and detector b over some time interval dT represented by $<CC_{ab}>$ and dividing by the product of the probability of measuring a single photon on detector a or detector b, represented as $<D_a>$ and $<D_b>$ respectively. $G^{(2)}$ can then be computed as $<CC_{ab}>/[<D_a>*<D_b>]$. $G^{(2)}$ is typically a more stable measure than the raw measurement of the counting rates of coincidences and single photons. The present system and method can leverage the entanglement to authenticate the information being communicated. Generated entangled photons can be authenticated by examining the $G^{(2)}$ values of the measurements. $G^{(2)}$ values equal to 1 indicate a Poissonian source for the photons, such as a typical laser source. $G^{(2)}$ values greater than 2 indicate a super Poissonian source for the photons and is typical for entangled photon sources.

For this inventive entangled photon communications system a laboratory proof of principle demonstration experiment was performed where a sender launches information encoded entangled photon pairs through fiber optics to a receiver and the receiver decoded information from the entangled photons. Although entangled photons are relatively difficult to generate, the inventors use co-propagating entangled photons because they are reasonably insensitive to atmospheric phase aberrations since the photons do not exhibit polarization until after measurement. Entanglement can be used by the receiver to authenticate the source of the signal and can correct timing between the photon pairs after or during data reception. Very few entangled correlated photons need to be sent to the receiver to transmit a message. Thus, entanglement optical communications requires significantly fewer photons than conventional optical communications by approximately 12 orders of magnitude (e.g. picowatts of optical power to transmit information). For example, conventional fiber optical communications typically uses between 3-10 mW of optical power to transmit information. Whereas the equivalent optical power for 10,000 entangled photons per second is approximately $10^{-12}$ mW.

The transmission of information through harsh environments is challenging for conventional optical communications. An embodiment of the present invention is designed to operate well in those conditions at much lower transmitted power, which is a highly desirable property. This invention has the benefit of making the transmission of information less susceptible to potential eavesdropping than higher optical power signals and because it is at such a lower power the current invention is less hazardous to people and/or equipment that may be in the communications path.

Variations of the system will be able to operate over fiber or free-space in the atmosphere or in a mixture of both fiber and free-space. Fiber communications has already been verified through preliminary experiments over a range of 27 km and would be expected to go much further. Free-space communications distance will depend on the entangled photon flux and collimation of the optics. Kilometer distances through the atmosphere are feasible, however, verified bit rate will decline as a function of distance. It is to be appreciated that laboratory and field experiments using setups similar to those shown in FIG. 1, can be used to quantify the effects of the design parameters on communication distances and the effects of turbulence on a system.

From these measurements, theory, and analyses it is clear that photon systems that incorporate measurement of coincidences in two alternate but indistinguishable configurations enable transfer of virtually undistorted information through turbulence and other scattering media. In particular, the present co-propagating entangled photon system enables efficient transfer through atmospheric turbulence because it produces two alternate but indistinguishable means of measuring a joint detection. The improved transfer of information through turbulence or scattering by the present system over non-entangled photons is also enhanced because of the superposition of the two polarization states and the fact that the entangled photons do not exhibit individual polarization subject to turbulence or scattering phase aberrations while transiting the turbulence media. It is to be appreciated that entangled photon communications is inherently more secure than prior art optical communications systems, particularly at how intensity levels which makes interception and detection difficult, because measurement of one of the photons of an entangled pair does not reveal information about the information encoded on the entangled photon pair.

BRIEF DESCRIPTION OF THE DRAWINGS

The embodiments herein will be better understood from the following detailed description with reference to the drawings, in which.

DETAILED DESCRIPTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention. Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second entangled photon regions, these terms are only used to distinguish one entangled photon source, region, element, component, layer or section from another source, region, element, component, layer or section. Thus, a first source, region, element, component, layer or section discussed below could be termed a second source, region, element, component, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
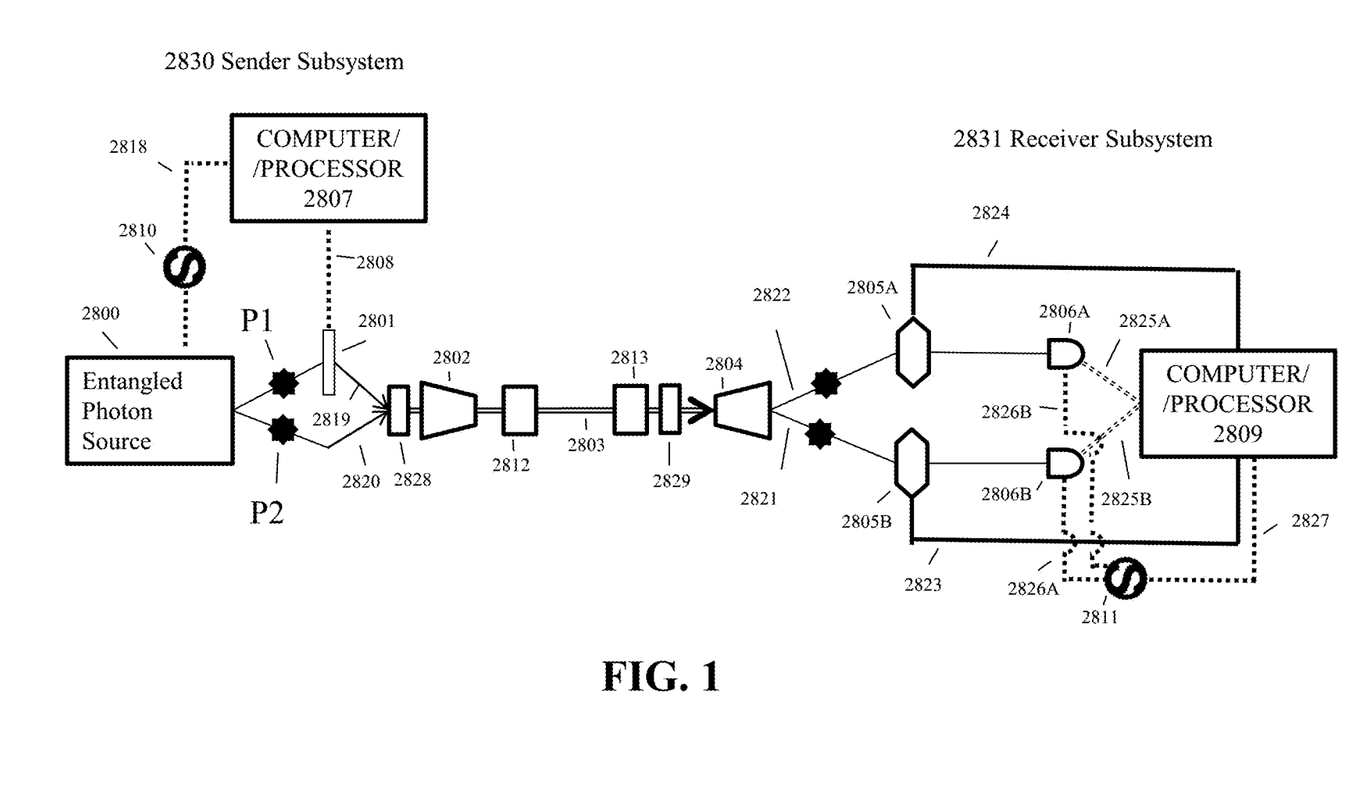
FIG. 1 is a schematic block diagram illustration of a preferred embodiment entangled photon communications system to transfer information from a sender to a receiver using at least one pair of entangled photons and a modulator to encode the information to be transmitted.

Accordingly, the present invention utilizes entangled photons and their properties as carriers of information that is encoded in the relationship between the pairs of entangled photons. A preferred embodiment of the current invention is shown in FIG. 1. The sender system 2830 comprising the processor, the modulator, the photon combiner and the transmitter coupler. The receiver subsystem 2831 comprising the polarization analyzers, the detectors, a receiver coupler and photon de-combiner. A pulsed entangled photon source 2800 provides photon pairs entangled in the polarization degree of freedom. Photon P1 of an entangled photon pair is directed towards modulator 2801 along path 2819. Modulator 2801 may be a phase or polarization modulator. Modulator 2801 applies a phase change in the polarization of an input photon by a controlled amount of phase, i.e. an input 0 degree polarized photon can be transformed into a 90 degree polarized photon.

The modulator 2801 is controlled by processor 2807 which sets the degree of phase to be applied in accordance with the value to be transmitted. The degree of phase controls from processor 2807 are sent to modulator 2801 over path 2808. In some examples, the processor may be a computer, microprocessor or other type of processing means. After modulator 2801 the modulated photon is directed to a photon combiner 2802. Photon combiner 2802 is operative to accept at least two distinct inputs and direct them into a single output. Photon combiners may include devices such as wave-division multiplexers (WDM), beam-splitters, 2×1 fiber couplers or other similar photonic devices. Photon P2 of the entangled photon pair is directed over an equal time path length, the propagation time being equal to the propagation time of P1 to photon combiner 2802 along the path indicated by 2820.

After passing through photon combiner 2802 the entangled photon pair P1-P2 is directed to transmission coupler 2812. Transmission coupler 2812 may be, for example, an interface to a telescope for a free-space propagation path or fiber-coupler to interface to a fiber optic propagation path. After transmission coupler 2812 the entangled photon pair P1-P2 is directed to co-propagate along path 2803 which may be a fiber optic path, a free-space path, or any combination of the two. Path 2803 may include adverse photon propagation effects such as scattering, absorption, phase distortions, or turbulence.

After propagation along path 2803 photons are directed towards a receiver coupler 2813. Receiver coupler 2813 may be, for example, a telescope for receiving entangled photon pairs propagated over a free-space path or a fiber coupler. After receiver coupler 2813 the entangled photon pairs are directed towards photon de-combiner 2804. Photon de-combiner 2804 is operative to accept one input and direct that into at least two outputs. Photon de-combiners may include devices such as wave-division multiplexers (WDM), beam-splitters, 1×2 fiber couplers or other similar photonic devices. Photon de-combiner 2804 operates to direct one photon of an entangled pair to polarization analyzer 2805A over path 2822 and the other photon of an entangle photon pair to polarization analyzer 2805B over path 2821.

Polarization analyzers 2805A and 2805B consist of half-wave plates and quarter wave-plates and a polarizer and can be configured by computer/processor 2809 to make measurements in any polarization basis and to correct for any systematic polarization distortions occurring along path 2803. Controls from computer/processor 2809 are sent to polarization analyzer 2805A along path 2824 and controls from computer/processor 2809 are sent to polarization analyzer 2805B along path 2823. After propagation through polarization analyzers the photons are directed to detectors 2806A and 2806B respectively.

The detectors register the presence of a photon at a particular time and the measurement is sent to computer/processor 2809. When detectors 2806A or 2806B register the presence of a photon that information is sent to computer/processor 2809 over the paths 2825A and 2825B respectively. Computer/processor 2809 can determine the coincidences between each detector comprising 2806A and 2806B. The coincidence events can further be processed into $G^{(2)}$ values or other statistical measures. The detectors 2806A and 2806B may be gated and timing synchronized with the expected arrival time of the photons being transmitted from the sender.

Components 2810 and 2811 are clocks which may be provided by, for example, atomic clocks, GPS, or entangled photon source 2800. Timing information from Clock 2810 on the transmitter/sender may operate to regulate the rate at which entangled photons are generated, i.e. 1 GHz. If clock 2810 is provided by the pulsed entangled photon source 2800 then the timing information is provided to the computer/processor 2807. Timing information is provided to the pulsed entangled photon source 2800 or to computer/processor 2807 or both 2800 and 2807 along path 2818.

Clock 2811 for the receiver operates to synchronize the gating of detectors 2806A and 2806B with the expected arrival time of the entangled photons transmitted by the sender and to provide computer/processor 2809 with a time-of-measurement for each photon detected by detectors 2806A and 2806B. Note that Clock 2811 may be provided by the sender as an auxiliary photon pulse such as from the residual pump photons that generated the entangled photon pair. Timing information from clock 2811 is sent to detector 2806A along path 2826B and to detector 2806B along path 2826A, timing information from the clock 2811 is provided to computer/processor 2809 along path 2827. The residual pump pulse in an embodiment with this feature is measured by the receiver and converted to an electrical clock signal which is then used to gate detectors 2806A and 2806B and to provide computer/processor 2809 a time-of-measurement for each photon detected by detectors 2806A and 2806B.

Filters 2828 and 2829 operate to transmit specified wavelengths and reject all other wavelengths. Filter 2828 for the sender may be used to optimize entangled photon propagation through absorbing media by only transmitting photons with wavelengths that are in the low absorption wavelength regions of the media. Filter 2829 prior to 2804 maybe used, for example, to reject stray photons that may have entered in from a free-space propagation path or to reduce noise photons generated along paths of other types of media that are not at the wavelengths that the sender is transmitting. It should be recognized that filtering may be applied between any of the optical components.

Figure 2:
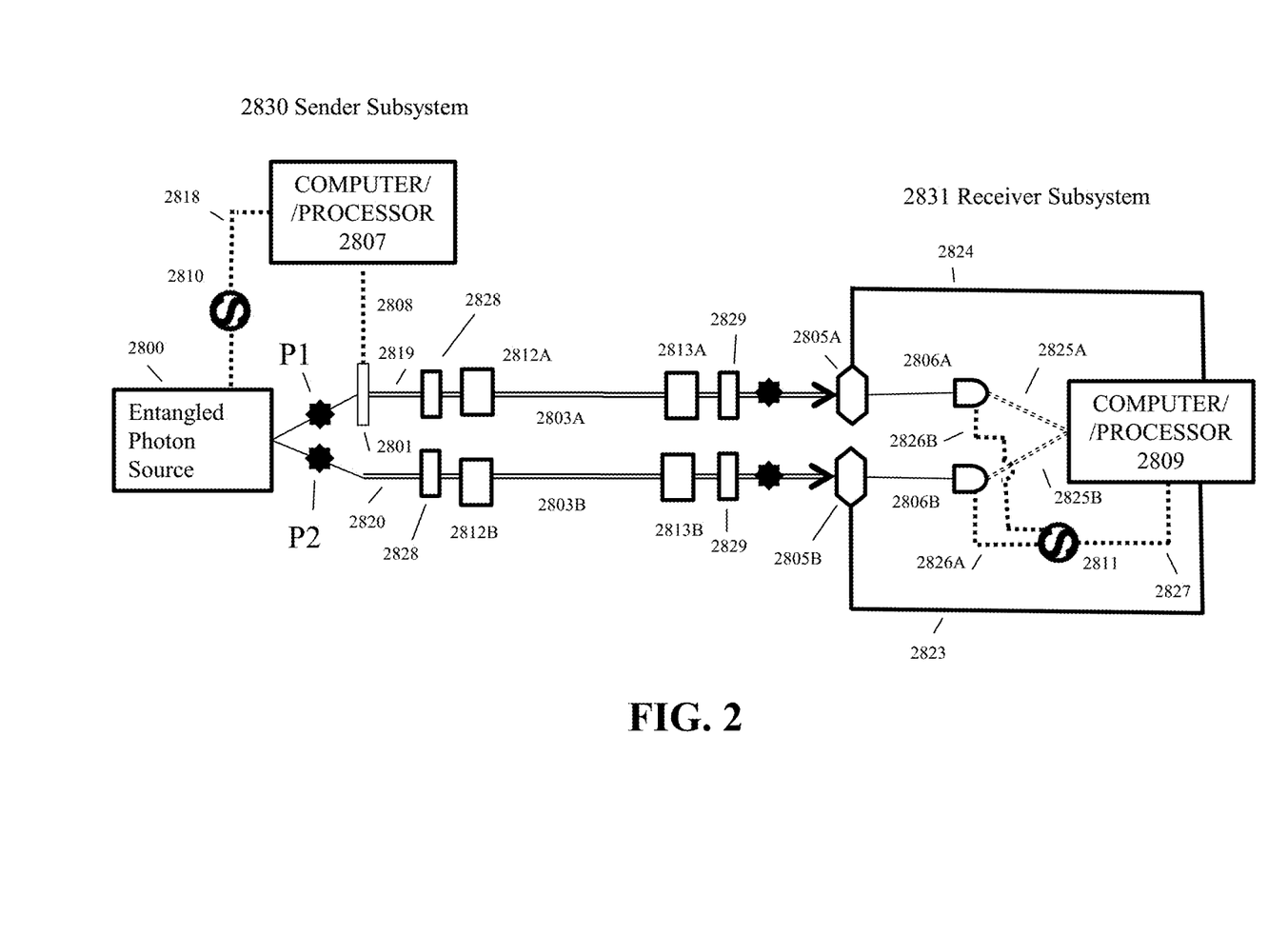
FIG. 2 is a schematic block diagram illustration of an alternative preferred embodiment entangled photon communications system to transfer information from a sender to a receiver using at least one pair of entangled photons and a modulator to encode the information to be transmitted.

FIG. 2 is a schematic illustration of an alternate preferred embodiment for communications using entangled photons absent conventional communications. A pulsed entangled photon source 2800 provides photon pairs entangled in the polarization degree of freedom. Photon P1 of an entangled photon pair is directed towards modulator 2801 along path 2819. Modulator 2801 applies a phase change to an input photon by a controlled amount of phase transformation, i.e. an input 0 degree polarized photon can be rotated into a 90 degree polarized photon. Modulator 2801 is controlled by computer/processor 2807 which sets the degree of phase to be applied in accordance with the value to be transmitted. The degree of phase controls from computer/processor 2807 are sent to modulator 2801 over path 2808.

After modulator 2801 the modulated photon P1 is directed to propagate to a transmission coupler 2812. Transmission coupler 2812A may be, for example, an interface to a telescope for a free-space propagation path or fiber-coupler to interface to a fiber optic propagation path. After propagation through transmission coupler 2812A the photons P1 are directed towards the receiver along path 2803A. Photon P2 of the entangled photon pair is directed over an equal time path length, the propagation time being equal to the propagation time of P1 to the exit of 2801 along the path indicated by 2820. Photon P2 of the entangled photon pair is directed to propagate towards a transmission coupler 2812B. After propagation through transmission coupler 2812B photons P2 are directed towards the receiver along path 2803B. Paths 2803A and 2803B may include, distinct to each path, adverse photon propagation effects such as scattering, absorption, phase distortions, or turbulence. After propagation along path 2803A photon P1 is directed towards a receiver coupler 2813A.

Receiver coupler 2813A may be, for example, a telescope for receiving entangled photon pairs propagated over a free-space path or a fiber coupler. After propagation through receiver coupler 2813A photons P1 are directed towards polarization analyzer 2805A. Photon P2 after propagating along path 2803B is directed towards a receiver coupler 2813B. After propagation through receiver couplers 2813B photons P2 are directed towards polarization analyzer 2805B. Polarization analyzers 2805A and 2805B consist of half-wave plates and quarter wave-plates and a polarizer and can be configured by computer/processor 2809 to make measurements in any polarization basis and to correct for any systematic polarization distortions occurring along paths 2803A and 2803B respectively.

After propagation through polarization analyzers the photons are directed to detectors 2806A and 2806B respectively. The detectors register the presence of a photon at a particular time and the measurement is sent to computer/processor 2809. When detectors 2806A or 2806B register the presence of a photon that information is sent to computer/processor 2809 over the paths 2825A and 28256B respectively. Controls from computer/processor 2809 are sent to polarization analyzer 2805A along path 2824 and controls from computer/processor 2809 are sent to polarization analyzer 2805B along path 2823.

Computer/processor 2809 can determine the coincidences between each detector comprising 2806A and 2806B. The coincidence events can further be processed into $G^{(2)}$ values or other statistical measures. The detectors 2806A and 2806B may be gated and timing synchronized. Components 2810 and 2811 are clocks which may be provided by, for example, atomic clocks, GPS, or entangled photon source 2800. Clock 2810 on the transmitter side may operate to regulate the rate at which entangled photons are generated, i.e. 1 GHz. If clock 2810 is an external clock, if clock 2810 is provided by the pulsed entangled photon source 2800 then the timing information is provided to the computer/processor 2807. Timing information is provided to the pulsed entangled photon source 2800 or to computer/processor 2807 or both 2800 and 2807 along path 2818.

Clock 2811 for the receiver operates to synchronize the gating of detectors 2806A and 2806B with the expecting arrival time of the entangled photons transmitted by the sender. Components 2810 and 2811 are clocks which may be provided by, for example, atomic clocks, GPS, or entangled photon source 2800. Clock 2810 on the transmitter side operates to regulate the rate at which entangled photons are generated, i.e. 1 GHz. Clock 2811 for the receiver operates to synchronize the gating of detectors 2806A and 2806B with the expecting arrival time of the entangled photons transmitted by the sender and to provide computer/processor 2809 with a time-of-measurement for each photon detected by detectors 2806A and 2806B. Note that Clock 2811 may be provided by the sender as an auxiliary photon pulse such as from the residual pump photons that generated the entangled photon pair. Timing information from clock 2811 is send to detector 2806A along path 2826B and to detector 2806B along path 2826A, timing information from the clock 2811 is provided to computer/processor 2809 along path 2827. The residual pump pulse in an embodiment with this feature is measured by the receiver and converted to an electrical clock signal which is then used to gate detectors 2806A and 2806B and to provide computer/processor 2809 a time-of-measurement for each photon detected by detectors 2806A and 2806B.

Filters 2828 and 2829 operate to transmit specified wavelengths and reject all other wavelengths. Filter 2828 for the sender may be used to optimize entangled photon propagation through absorbing media by only transmitting photons with wavelengths that are in the low absorption wavelength regions of the media. Filter 2829 prior to 2805A and 2805B may be used, for example, to reject stray photons that may have entered in from a free-space propagation path or to reduce noise photons generated along paths of other types of media that are not at the wavelengths that the sender is transmitting. It should be recognized that filtering may be applied between any of the optical components.

Figure 3:
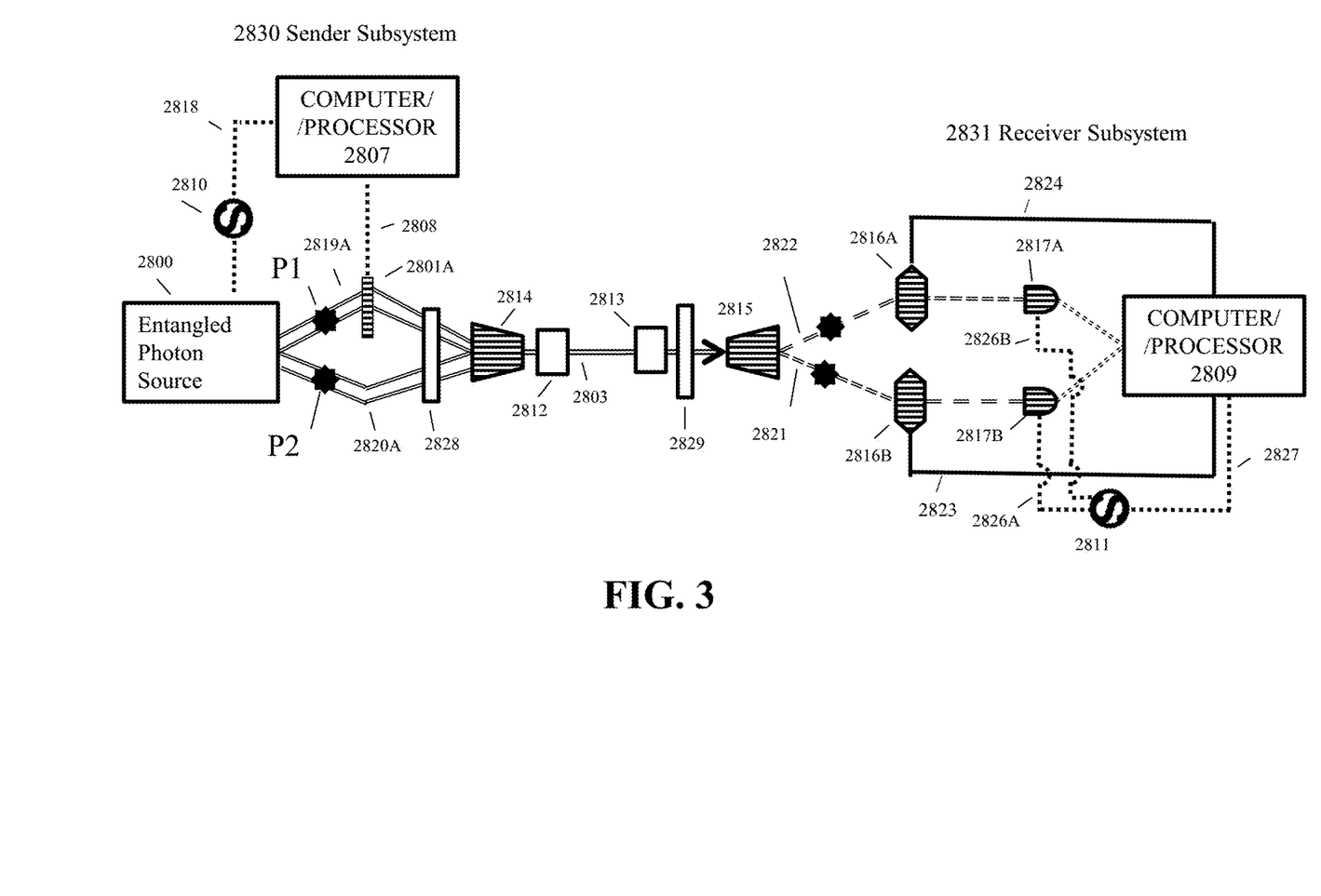
FIG. 3 is a schematic block diagram illustration of a preferred embodiment entangled photon communications system to transfer information from a sender to a receiver using at least one pair of entangled photons at multiple channels and a modulator to encode the information to be transmitted.

FIG. 3 is a schematic illustration of a preferred embodiment for communications using entangled photons absent conventional communications. A pulsed entangled photon source 2800 provides a plurality of photon pairs entangled in the polarization degree of freedom. The plurality of polarization entangled photon pairs maybe separated into, for example, correlated wavelengths where each P1-P2 pair of entangled photons is created with wavelength $\lambda_1$ and $\lambda_2$. Each of the wavelength correlated pairs can be modulated separately such that the sender can transmit multiple bits of information to the receiver per unit time wherein each bit is encoded between a pair of wavelengths which contain a polarization entangled photon. Photons P1 of a sequence of entangled photon pairs are directed towards a multi-channel modulator 2801A along the paths indicated by 2819A.

Modulator 2801A applies a change of phase to the polarization of an input photon by a controlled amount of phase. In one example, an input 0 degree polarized photon can be rotated into a 90 degree polarized photon for each channel of the plurality of entangled photons. Modulator 2801A is controlled by computer/processor 2807 which sets the degree of phase for each channel to be applied in accordance with the value to be transmitted. The degree of phase controls from computer/processor 2807 are sent to modulator 2801A over path 2808.

After modulator 2801A the modulated photons are directed to combiner 2814 which may include wave-division multiplexers (WDM), beam-splitters, beam-splitters, N×1 fiber couplers or other similar photonic devices. Combiner 2814 is operative to accept at least two distinct inputs and direct them into a single output. Photon P2 of the plurality of entangled photon pairs are directed over an equal time path length, the propagation time being equal to the propagation time of the P1 photons to combiner 2814 along the paths indicated by 2820A. After passing through combiner 2814 the plurality of entangled photon pairs P1-P2 are directed to transmission coupler 2812.

Transmission coupler 2812 may be, for example, an interface to a telescope for a free-space propagation path or fiber-coupler to interface to a fiber optic propagation path. After transmission coupler 2812 the plurality of entangled photon pairs P1-P2 are directed to co-propagate along path 2803 which may be a fiber optic path, a free-space path, or any combination of the two. Path 2803 may include adverse photon propagation effects such as scattering, absorption, phase distortions, or turbulence. After propagation along path 2803 photons are directed towards a receiver coupler 2813.

In one example, receiver coupler 2813 may be a telescope for receiving entangled photon pairs propagated over a free-space path or a fiber coupler. After receiver coupler 2813 the entangled photon pairs are directed towards de-combiner 2815. De-combiner 2815 is operative to accept one input and direct the input photons into at least two outputs. De-combiner 2815 operates to direct photons of the plurality of entangled photon pairs polarization analyzers 2816A over path 2822 and the other photon of the plurality of entangle photon pairs are directed to polarization analyzer 2816B over path 2821.

Polarization analyzers 2816A and 2816B consist of half-wave plates and quarter wave-plates and polarizers and can be configured by computer/processor 2809 to make measurements in any polarization basis for each pair of channels of the plurality of entangled photon pairs and to correct for any systematic polarization distortions occurring along path 2803. Controls from computer/processor 2809 are sent to polarization analyzer 2816A along path 2824 and controls from computer/processor 2809 are sent to polarization analyzer 2816B along path 2823. After propagation through polarization analyzers the plurality of photons are directed to detectors 2817A and 2817B respectively.

The detectors register the presence of a photon at a particular time and the measurement is sent to computer/processor 2809. When detectors 2817A or 2817B register the presence of a photon that information is sent to computer/processor 2809 over the paths 2826A and 2826B respectively. Computer/processor 2809 can determine the coincidences between the plurality of detection events between each detector(s) comprising 2817A and 2817B. The coincidence events can further be processed into $G^{(2)}$ values or other statistical measures. The detectors 2817A and 2817B which may be single detectors on each channel of the plurality of photons may be gated and timing synchronized individually with the expected arrival time of the plurality of photons being transmitted from the sender.

Components 2810 and 2811 are clocks which may be provided by, for example, atomic clocks, GPS, or entangled photon source 2800. Clock 2810 on the transmitter side operates to regulate the rate at which entangled photons are generated, i.e. 1 GHz. If clock 2810 provided by the pulsed entangled photon source 2800 then the timing information is provided to the computer/processor 2807. Timing information is provided to the pulsed entangled photon source 2800 or to computer/processor 2807 or both 2800 and 2807 along path 2818.

Clock 2811 for the receiver operates to synchronize the gating of the plurality of detectors 2817A and 2817B with the expected arrival time of the entangled photons transmitted by the sender and to provide computer/processor 2809 with a time-of-measurement for each photon detected by the plurality of detectors 2817A and 2817B. Note that Clock 2811 may be provided by the sender as an auxiliary photon pulse such as from the residual pump photons that generated the entangled photon pair. Timing information from Clock 2811 is sent to detectors 2817A along path 2826B and to detector 2817B along path 2826A, and timing information from Clock 2811 is provided to computer/processor 2809 along path 2827.

The residual pump pulse in an embodiment with this feature is measured by the receiver and converted to an electrical clock signal which is then used to gate detectors 2817A and 2817B and to provide computer/processor 2809 a time-of-measurement for each photon detected by detectors 2817A and 2817B. Filters 2828 and 2829 operate to transmit specified wavelengths and reject all other wavelengths. Filter 2828 for the sender may be used to optimize entangled photon propagation through absorbing media by only transmitting photons with wavelengths that are in the low absorption wavelength regions of the media. Filter 2829 prior to 2815 maybe used, for example, to reject stray photons that may have entered in from a free-space propagation path or to reduce noise photons generated along paths of other types of media that are not at the wavelengths that the sender is transmitting. It should be recognized that filtering may be applied between any of the optical components.

Figure 4:
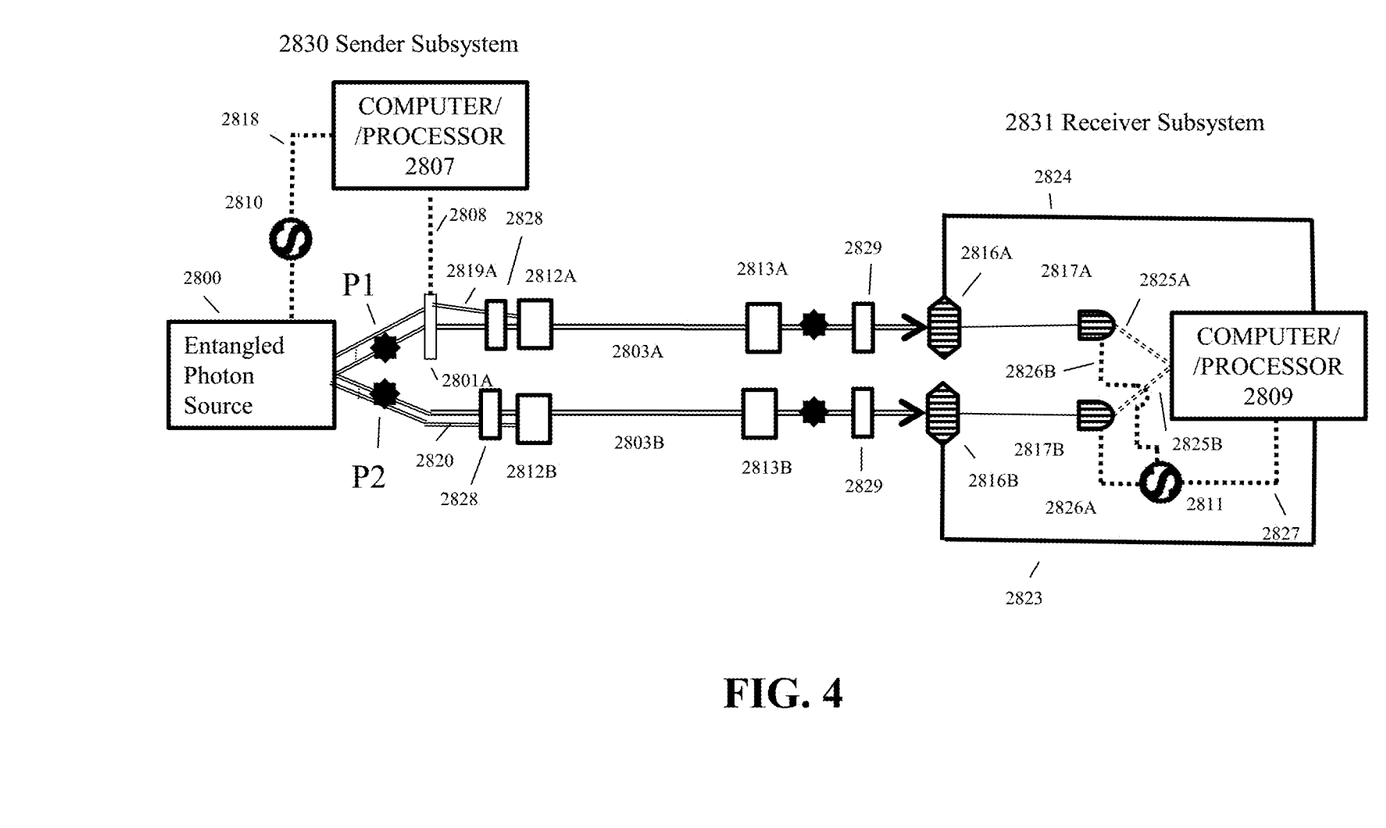
FIG. 4 is a schematic block diagram illustration of a preferred embodiment entangled photon communications system to transfer information from a sender to a receiver using at least one pair of entangled photons at multiple channels and a modulator to encode the information to be transmitted.

FIG. 4 is a schematic illustration of a preferred embodiment for communications using entangled photons absent conventional communications. A pulsed entangled photon source 2800 provides photon pairs entangled in the polarization degree of freedom. The plurality of polarization entangled photon pairs maybe separated into, for example, correlated wavelengths where each P1-P2 pair of entangled photons is created with wavelength $\lambda_1$ and $\lambda_2$. Each of the wavelength correlated pairs can be modulated separately such that the sender can transmit multiple bits of information to the receiver per unit time wherein each bit is encoded between a pair of wavelengths which contain a polarization entangled photon. Photons P1 of a sequence of entangled photon pairs are directed towards a multi-channel modulator 2801A along paths 2819A.

Modulator 2801A applies a change of phase to the polarization of an input photon by a controlled amount of phase, i.e. an input 0 degree polarized photon can be rotated into a 90 degree polarized photon for each channel of the plurality of entangled photons. Modulator 2801A is controlled by computer/processor 2807 which sets the degree of rotation to be applied in accordance with the value to be transmitted. The degree of rotation controls from computer/processor 2807 are sent to modulator 2801A over path 2808. After modulator 2801A the modulated plurality of photons P1 are directed to propagate to a transmission coupler 2812A.

Transmission coupler 2812A may be, for example, an interface to a telescope for a free-space propagation path or fiber-coupler to interface to a fiber optic propagation path. After propagation through transmission coupler 2812A the photons P1 are directed towards the receiver along path 2803A. Photon P2 of the entangled photon pairs are directed over an equal time path length, the propagation time being equal to the propagation time of P1 to the exit of 2801A along the path indicated by 2820. Photons P2 of the entangled photon pairs are directed to propagate towards a transmission coupler 2812B. After propagation through transmission coupler 2812B photons P2 are directed towards the receiver along path 2803B. Paths 2803A and 2803B may include, distinct to each path, adverse photon propagation effects such as scattering, absorption, phase distortions, or turbulence. After propagation along path 2803A photon P1 is directed towards a receiver coupler 2813A.

Receiver coupler 2813A may be, for example, a telescope for receiving entangled photon pairs propagated over a free-space path or a fiber coupler. After propagation through receiver coupler 2813A photons P1 are directed towards the plurality of entangled photon pair polarization analyzers 2816A and 2816B. Photons P2 after propagating along path 2803B are directed towards a receiver coupler 2813B. After propagation through receiver coupler 2813B photons P2 are directed towards polarization analyzer 2816B. Polarization analyzers 2816A and 2816B consist of half-wave plates and quarter wave-plates and a polarizer and can be configured by computer/processor 2809 to make measurements in any polarization basis and to correct for any systematic polarization distortions occurring along paths 2803A and 2803B respectively.

After propagation through polarization analyzers the photons are directed to detectors 2817A and 2817B respectively.

The detectors register the presence of a photon at a particular time and the measurement is sent to computer/processor 2809. Computer/processor 2809 can determine the coincidences between each detector comprising 2817A and 2817B. The coincidence events can further be processed into $G^{(2)}$ values or other statistical measures. The detectors 2817A and 2817B may be gated and timing synchronized.

Components 2810 and 2811 are clocks which may be provided by, for example, atomic clocks, GPS, or entangled photon source 2800. Clock 2810 on the transmitter side may operate to regulate the rate at which entangled photons are generated, i.e. 1 GHz. If clock 2810 is an external clock, if clock 2810 is provided by the pulsed entangled photon source 2800 then the timing information is provided to the computer/processor 2807. Timing information is provided to the pulsed entangled photon source 2800 or to computer/processor 2807 or both 2800 and 2807 along path 2818. Clock 2811 for the receiver operates to synchronize the gating of detectors 2817A and 2817B with the expecting arrival time of the entangled photons transmitted by the sender. Components 2810 and 2811 are clocks which may be provided by, for example, atomic clocks, GPS, or entangled photon source 2800. Clock 2810 on the transmitter side operates to regulate the rate at which entangled photons are generated, i.e. 1 GHz.

Clock 2811 for the receiver operates to synchronize the gating of detectors 2817A and 2817B with the expecting arrival time of the entangled photons transmitted by the sender and to provide computer/processor 2809 with a time-of-measurement for each photon detected by detectors 2817A and 2817B. Note that Clock 2811 may be provided by the sender as an auxiliary photon pulse such as from the residual pump photons that generated the entangled photon pair. Timing information from Clock 2811 is sent to detector 2817A along path 2826B and to detector 2817B along path 2826A, timing information from the clock 2811 is provided to computer/processor 2809 along path 2827.

The residual pump pulse in an embodiment with this feature is measured by the receiver and converted to an electrical clock signal which is then used to gate detectors 2817A and 2817B and to provide computer/processor 2809 a time-of-measurement for each photon detected by detectors 2817A and 2817B. When detectors 2817A or 2817B register the presence of a photon that information is sent to computer/processor 2809 over the paths 2825A and 2825B respectively. Controls from computer/processor 2809 are sent to polarization analyzer 2816A along path 2824 and controls from computer/processor 2809 are sent to polarization analyzer 2816B along path 2823.

Filters 2828 and 2829 operate to transmit specified wavelengths and reject all other wavelengths. Filter 2828 for the sender may be used to optimize entangled photon propagation through absorbing media by only transmitting photons with wavelengths that are in the low absorption wavelength regions of the media. Filter 2829 prior to 2816A and 2816B may be used, for example, to reject stray photons that may have entered in from a free-space propagation path or to reduce noise photons generated along paths of other types of media that are not at the wavelengths that the sender is transmitting. It should be recognized that filtering may be applied between any of the optical components.

Figure 5:
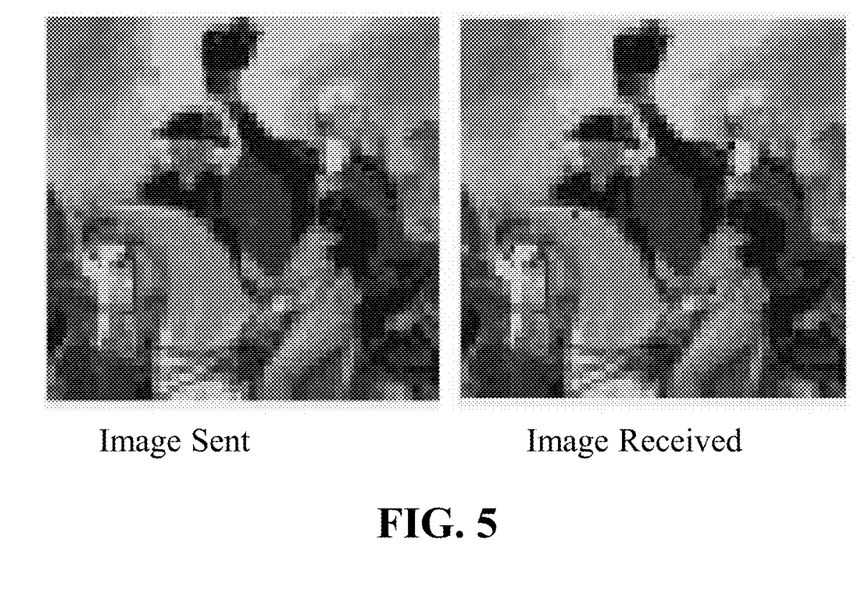
FIG. 5 is a depiction of the results from the operation of a preferred embodiment to transmit a color image.

In one example, approximately 8000 photon detections per second were utilized to receive an on-off keyed bit in one second of elapsed time. FIG. 5 shows the results using an embodiment where a 16 bit color image was transmitted over 1 km of fiber with ground-glass scattering media inserted into the optical path. This demonstration utilized the three stage encoding for each bit of the color image. The image on the left of FIG. 5 is the image that is being transmitted and the image on the right is the image measured by the receiver. Comparison between the two images shows only minor discrepancies of the received image and the received image is still fully recognizable.

As used herein, the terminology "channel" means that the entangled photon pairs have two further measurable properties such as wavelength where, for example, one photon of the entangled pair can be measured at wavelength A and the other photon of the entangled pair can be measured at wavelength B. An exemplary example of a device that can separate an input signal into distinct channels is a wave division multiplexer (WDM). A wave division multiplexer operates on the principle of wavelength diffraction. In wavelength diffraction, when light of a specific wavelength interacts with the diffracting media it is reflected or transmitted at a specific angle. In a typical fiber optic WDM two wavelengths are input into the device which is built to transmit or "pass" one wavelength and reflect all other wavelengths. This can be used to combine two distinct wavelengths into a single fiber called "common" with low loss. Similarly, if two wavelengths are input along the "common" path, the "pass" wavelength will be transmitted and all other wavelengths will be reflected into a "reflected" path. So, to combine two wavelengths the pass wavelength is input on the "pass" path and other wavelengths are input into the reflection path. The input on the "pass" path is transmitted into the "common" path and the input on the "reflection" path is reflected into the "common" path. To separate multiple wavelengths, a multiple wavelength single is input along the "common" path, the "pass" wavelength is transmitted into the "pass" path and all other wavelengths are reflected into the "reflect" path.

It should be recognized that commercially available WDMs operating in the telecom range have a set of defined pass wavelengths and are labeled at ITU channels. Each channel is 100 GHz wide in frequency units, about 0.8 nm wide in wavelength units, with a small bandwidth gap between each ITU channel to reduce wavelength "crosstalk". If must be noted that WDMs may operate as a filter for the "pass" path, i.e. only photons of the frequency or wavelength of the "pass" channel will propagate thru the pass path and all other frequencies and wavelengths will be reflected away from the "pass" path.

In the current invention it must be recognized that any photon possesses multiple degrees of freedom including but not limited to polarization, frequency, photon-number, phase, wavelength, orbital angular momentum, and linear momentum. Entanglement can exist between polarizations, e.g. horizontal and vertical, or between any of the degrees of freedom of a photon or multiple photons. The properties the other degrees of freedom can be used to separate photons into distinct paths, i.e. channels, without disturbing the entanglement that exists on other degrees of freedom. In the specific instance of the current invention, the entanglement relationship being modulated is polarization entanglement and the wavelength degree of freedom is used to separate photons onto distinct paths.

Measurement of a photon by a detector typically entails the absorption of the photon by a photo-sensitive material. The photo-sensitive material would then typically produce an excess charge or change in current that would be recorded as a detection of a photon. It should be further appreciated that communication of data from a sender to a receiver in the presence of noise can be better represented by correlation measurements between two detectors than measurement by either of the detectors separately. Single photon measurements may be subject to a variety of noise from sources such as quantum noise, stray light scattering, and detector noise. Joint detection or coincidence measurements which include correlation measurements and Bell state measurements, etc., largely reduce the effects of this type of noise that would otherwise degrade the data, signal or message that would be communicated.

While it is not generally appreciated in this area, corrections can also be made to the coincidence measurements by first determining the background level of coincidence detections and compensating for this background by incorporating the single photon measurements as described in R. Meyers, et al., U.S. Pat. Nos. 9,131,128 and 9,123,114, herein incorporated by reference. Interpretations of measurements between at least two detectors such as in coincidence measurements can be improved by monitoring the single photon measurement counts and scaling by incorporating the single photon counts. For example, for photon number resolving detectors, the subtraction of the product of a relevant time average of the single photon counts from the relevant time average of the product of the single photon counts may improve the fidelity of the information received by the receiver that was sent by the sender. Also periods of high coincidence measurements with low single photon counts may indicate periods where there is low background noise and where signals can be received with higher fidelity.

As used herein the terminology "correlated" means that the correlation value is non-zero, i.e. positive or negative, and uncorrelated means that the correlation value is zero.

Entangled Photon Sources:

Exemplary examples of entangled photon sources include entangled photons generated via Spontaneous Parametric Down-conversion (SPDC) in a nonlinear crystal such a Beta-Barium Borate (BBO) or Potassium Titanyl Phosphate (KTP), entangled photons generated in a quasi-phase matched nonlinear media such as periodically poled KTP (PPKTP) or periodically poled Lithium Niobate (PPLN), and entangled photons generated in a four-wave mixing (FWM) process in a nonlinear optical fiber or polarization maintaining birefringent optical fiber.

Entangled photons generated with SPDC or FWM processes typically generated entangled photon pairs centered around two wavelengths, $\lambda_s$ and $\lambda_i$, these wavelengths are traditionally called signal and idler wavelengths. The signal wavelength is of a higher energy than the wavelength of the pump photons ($\lambda_p$) and the idler wavelength is at a lower energy/longer wavelength than the pump photons. The pump photons for the nonlinear process of entangled photon generation maybe be provided by, but are not limited to, pulsed or continuous laser sources.

It must be recognized that any photon possesses a number of degree of freedom including but not limited to polarization, frequency, photon-number, phase, wavelength, orbital angular momentum, and linear momentum. Entanglement can exist between polarizations, e.g. horizontal and vertical, frequencies, or between any of the degrees of freedom of a photon or multiple photons. It is to be appreciated that a stimulated FWM process may be employed to generate correlated photons whereas the more typical FWM methods rely upon a spontaneous process for the generation of photon pairs. Note that entanglement refers to the superposition of at least two components of a composite quantum state, such as the polarization of two photons, where the state of the system cannot be factored as a direct product of the components.

Measurement of the entangled photon pairs is an interference between conjugate degrees of freedom of a quantum particle pair (photon pair) and may exhibit constructive interference yielding a maxima of coincident detections or destructive interference yielding a minima of coincidence detections.

Entangled photons also have the property of temporal entanglement which means that the entangled pairs are entangled over a length of time interval between detector measurements that comprise a coincident detection.

Measurement Synchronization:

In order for a receiver to make accurate measurement of the information being transmitted by a sender with modulated entangled photons the receiver must synchronize the timing of their measurements with the times that the sender is transmitting entangled photons. One means to establish synchronized measurement of a pulsed source that operates at a known repetition rate involves scanning each detector over a range of delays spanning the time between two pulses. Each detector will measure a maximum of single photon counts when temporally synchronized with the rate the photons are being produced by the sender.

When the single photons counts are synchronized, then coincidence measurements between each pair of selected detectors are made with offsets for the coincidences being determined by +/− integer multiple offsets of the time between pulses. A peak of coincidence measurements will be found when, for example, detector A is at time $T(A_i)$ and detector B is at time $T(B_i)$ where i indicates the $i^{th}$ measurement in a sequence of single photon measurements. Further fine tuning of coincidences can be made by very slightly shifting TA or TB small amounts, within the duration of a pulse, to find a maxima of coincidences. It should be noted, that the relative time difference between the measured detection events for a coincidence measurement can be due to unequal propagation path distances, non-identical generation times of the entangled photons, and electronic processing buffering and lags when measured.

In the case of continuous source of entangled photons the measurements of the photon detections are shifted in time to find a maximum of coincidence detections. This may be accomplished, for example, by time-tagging all measured photons from all the detectors and the peak correlation can be found by post processing the time-tagged measurements to find the time-tag offsets for coincidence maxima. All of these effects are mitigated when applying the synchronization methods described above.

The foregoing description is illustrative of particular embodiments of the invention, but is not meant to be a limitation upon the practice thereof. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention.

What is claimed is:

1. A system for communicating data using entangled photons comprising:
 a sender subsystem;
 a receiver subsystem;
 at least one pulsed entangled photon source configured to output entangled photon pairs; the entangled photon pairs comprising first photons and second photons; the first and second photons being inputted to the sender subsystem;

the sender subsystem comprising:
at least one processor configured to receive inputted data, encode information, and apply signals to a modulator to modulate a state of the first photons;
the modulator configured to modulate the state of the first photons; a joint state of the entangled photon pair being modulated by the modulator;
a photon combiner to combine paths of the first and second photons;
a transmitter coupler configured to direct the modulated entangled photon pairs towards a receiver; and the receiver subsystem comprising:
at least two polarization analyzers;
at least two detectors;
a receiver coupler configured; the receiver coupler being configured to direct photons transmitted by the sender subsystem to a photon de-combiner;
the photon de-combiner configured to direct the first photons to a first polarization analyzer of the at least two polarization analyzers and direct the second photons to a second polarization analyzer of the at least two polarization analyzers;
the first polarization analyzer being configured to transmit first photons at a specified polarization to a first detector and the second polarization analyzer being configured to transmit second photons at a specified polarization to a second detector;
at least one processor configured to record both coincident and individual photon detection events by the of the at least two detectors, decode the transmitted information and output the decoded information;

whereby information is transmitted from the sender subsystem to the receiver through the modulation of an entangled photon state.

2. The system of claim 1 wherein the encoding of information to be transmitted is translated to a binary representation, transmission of each binary bit value of "1" entails setting the modulator to produce a peak of coincidences measured by the receiver and a bit value of "0" entails setting the modulator to produce a minima of coincidences measured by the receiver, and polarizers of the receiver being set to parallel polarizations.

3. The system of claim 2 wherein the transmission of a bit "1" entails setting the modulator to produce a sequence of high-low-high coincidences or $G^{(2)}$ by the receiver, and a bit value of "0" entails setting the modulator to produce a sequence of low-high-low coincidences measured by the receiver; a high-low-high coincidence or $G^{(2)}$ being interpreted as a "1" and a low-high-low sequence being interpreted by the receiver at a "0"; wherein $G^{(2)}$ is Glauber second order correlation.

4. The system of claim 3 wherein the information being transmitted is text.

5. The system of claim 3 wherein the information being transmitted is a color image.

6. The system of claim 1 wherein the modulated entangled photon pairs are combined on the photon combiner before being propagated over same path to the photon de-combiner at the receiver.

7. The system of claim 6 wherein propagation to the receiver is over paths comprising photon propagation effects including scattering, absorption, phase distortions and turbulence.

8. The system of claim 6 wherein the propagation from the sender subsystem to the receiver occurs over a mixture of free-space and fiber optic paths.

9. The system of claim 1 wherein the at least one pulsed entangled photon source provides a sequence of polarization entangled photon pairs across a plurality of distinguishable measureable channels, modulating the polarization of one of the sequence of photons of the polarization entangled photon pairs in each distinguishable channel, the receiver being configured to receive a plurality of distinguishable measureable channels, each channel being directed to a polarization analyzer associated with that channel, each channel of the receiver having a distinct detector, and the processor being configured to record single events and coincident events between specified pairs of detectors.

10. The system of claim 1 wherein the entangled photon pairs are provided by a four-wave mixing process.

11. The system of claim 1 wherein the entangled photon pairs are provided by a spontaneous parametric down-conversion process.

12. The system of claim 1 wherein the photon combiner is configured to combine entangled photons from the at least one pulsed entangled photon source onto a single path for signal and idler wavelength photons and the polarization entangled photons are generated at signal and idler wavelengths, and the photon de-combiner is configured to direct entangled photons onto distinct paths for signal and idler wavelength photons.

13. The system of claim 1 wherein the entangled photons are generated by a continuous source.

14. A method of data transfer from a sender unit to a receiver unit using entangled photons, wherein the sender unit and the receiver unit are each located at different physical locations, wherein at least one pulsed entangled photon source provides a plurality of distinguishable channels of polarization entangled photon pairs, and each channel of polarization entangled photon pairs is modulated individually, and the receiver unit provides a plurality of measurement devices operating to measure an entangled photon state between each distinguishable channel comprising:

providing the sender unit comprising an input for inputting data, a modulator, and at least one processor configured to convert the inputted data into a plurality of sequential information photons having information associated therewith;

providing the at least one pulsed entangled photon source configured to output polarization entangled photon pairs; the polarization entangled photon pairs comprising first photons and second photons;

providing the receiver unit comprising an input operating to receive the polarization entangled photon pairs, the measurement device operating to measure the state of the polarization entangled photon pairs, and at least two photodetectors;

measuring the state of the polarization entangled photon pairs using the at least two photodetectors to thereby transfer information; the information being transferred from the sender unit to the receiver unit through the transfer of the polarization entangled photon states modulated by the sender due to the polarization entanglement of the first and second photons.

15. The method of claim 14 wherein the information to be transmitted is text information.

16. The method of claim 14 wherein the information to be transmitted is image information.

17. The method of claim 14 wherein the polarization entangled photon pairs are generated by a four-wave mixing process.

18. The method of claim 14 wherein the polarization entangled photon pairs are generated by a spontaneous parametric down-conversion process.

19. The method of claim 14 wherein the polarization entangled photon pairs are generated by a continuous source.

\* \* \* \* \*